(No Model.)

E. KRAMER.
SLED BRAKE.

No. 430,033. Patented June 10, 1890.

Witnesses:
E. P. Ellis,
B. Brockett.

Inventor:
Edward Kramer,
per J. A. Lehmann, atty.

UNITED STATES PATENT OFFICE.

EDWARD KRAMER, OF DIVIDE, MONTANA.

SLED-BRAKE.

SPECIFICATION forming part of Letters Patent No. 430,033, dated June 10, 1890.

Application filed March 29, 1890. Serial No. 345,816. (No model.)

*To all whom it may concern:*

Be it known that I, EDWARD KRAMER, of Divide, in the county of Silver Bow and State of Montana, have invented certain new and useful Improvements in Brakes for Sleds, Sleighs, or Wagons; and I do hereby declare the following to be a full, clear, and exact description of the invention, such as will enable others skilled in the art to which it pertains to make and use it, reference being had to the accompanying drawings, which form part of this specification.

My invention relates to an improvement in brakes for sleds, sleighs, or wagons; and it consists in the combination and arrangement of parts fully described hereinafter and pointed out in the claims.

The object of my invention is to form the brakes or rods, which are sharp-pointed or provided with shoes at their rear ends and fastened at their front ends to the cross-piece of the pole, and to guide and control the rear ends of these brakes by means of a partially-revolving spring-actuated shaft which is journaled on the sled or sleigh and operated entirely by the driver.

Figure 1:
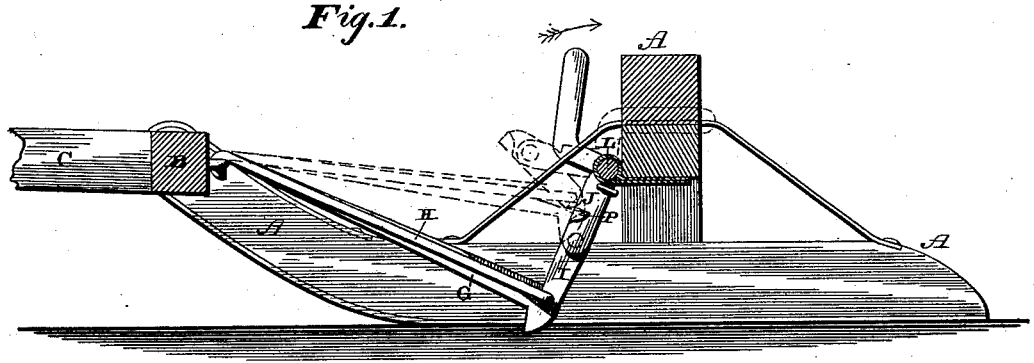
Figure 2:
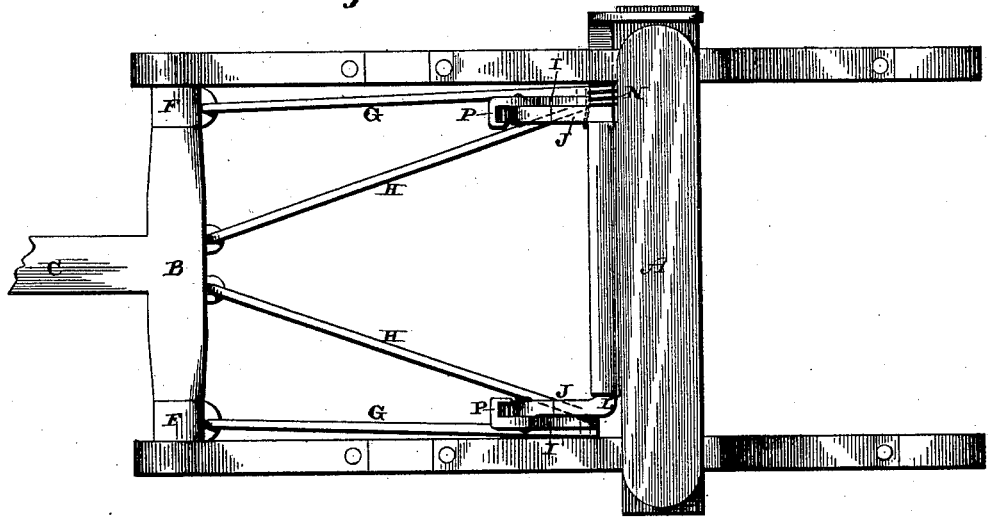

Figure 1 is a vertical section of a brake which embodies my invention, the parts being shown in one position in solid lines and in another position in dotted lines. Fig. 2 is a plan view of the same, showing the brakes in a raised position.

A represents an ordinary sled or sleigh, and B the partially-turning cross-piece secured to the rear end of the pole C and journaled between the front ends of the two runners.

Pivoted by means of collars F, secured to the end of the cross-piece B, or in any other way that may be preferred, are the two brakes G, which consist of rods which increase in width and thickness from their front to their rear ends, and which have formed on their rear ends the sharp points or shoes which engage with the snow or ice for the purpose of checking or entirely stopping the movement of the sled or wagon. Also extending rearwardly from the cross-piece B are the brace-rods H, which have their rear ends bent so as to act as pivots and unite to the rear ends of the brakes G the connecting-links I, by means of which the brakes are raised and lowered. These rods H also assist in receiving a portion of the strain that is brought to bear upon the brakes and assist in guiding the rear ends of the brakes as they are raised and lowered. The upper ends of the connecting-links I are pivoted to arms or levers J, which are secured to the partially-revolving spring-actuated shaft L, which is journaled in suitable bearings upon the sleigh or wagon, and which is provided with a crank at its outer end, so as to enable it to be operated by the driver. The spring N applied to the shaft serves to raise the brakes after the shaft has been given a slight movement by the driver and to hold them out of an operative position when not needed. When the crank is turned in the direction indicated by arrow, the levers J are raised, which carry with them the connecting-links and the brake G, as shown in dotted lines.

In order to lock the upper ends of the connecting-links and the arms or levers to which they are pivoted, suitable notches or recesses are formed in the edges of the arms or levers, and the upper ends of the connecting-links are provided with hooks or catches P to engage therewith and thus prevent any strain against the lower edges of the brakes from bringing the spring upon the shaft into operation. When the brakes are not needed, the partially-turning shaft, the levers, connecting-rods, and brakes assume the position shown in dotted lines.

Having thus described my invention, I claim—

1. The combination of the two brakes which are provided with sharp points at their lower ends and their upper ends extended forward and connected to the forward portion of the sled, the shaft which extends across and is journaled upon the frame, the two arms extending therefrom, and the connecting-links which have their lower ends connected to the rear end of the brakes and their upper ends pivoted to the said shaft-arms, substantially as shown and described.

2. The combination of the brakes which are provided with points at their lower ends and their upper ends extended forward and connected to the front of the frame, the operating-shaft which is journaled upon and extends across the sled-frame and provided with arms, and the connecting-links pivoted at their lower ends to the said brakes and to the said arms below their upper ends, whereby their upper ends engage the front side of the arms and form a lock, substantially as described.

3. The combination of the brakes having pointed lower ends and their upper ends extended forward and connected to the front of the sled-frame, the operating-shaft journaled upon and extending across the frame and provided with arms, the connecting-links pivoted at their upper portions to the said arms, and the rods which are connected at their upper ends to the front of the frame near its center and extending rearward and outward, and their lower ends pivoted to the lower ends of the said links, and the lower ends of the links pivoted to the brakes, substantially as set forth.

In testimony whereof I affix my signature in presence of two witnesses.

EDWARD KRAMER.

Witnesses:
QUITMAN OWEN,
ALBERT SMITH.